United States Patent
Uyeki

(10) Patent No.: US 8,583,304 B2
(45) Date of Patent: Nov. 12, 2013

(54) SYSTEM AND METHOD FOR PRECISE STATE OF CHARGE MANAGEMENT

(75) Inventor: Robert Uyeki, Torrance, CA (US)

(73) Assignee: Honda Motor Co., Ltd., Tokyo (JP)

( * ) Notice: Subject to any disclaimer, the term of this patent is extended or adjusted under 35 U.S.C. 154(b) by 167 days.

(21) Appl. No.: 13/076,314

(22) Filed: Mar. 30, 2011

(65) Prior Publication Data

US 2012/0253568 A1 Oct. 4, 2012

(51) Int. Cl.
*G06F 7/00* (2006.01)

(52) U.S. Cl.
USPC .............................. 701/22; 701/123; 701/424

(58) Field of Classification Search
None
See application file for complete search history.

(56) References Cited

U.S. PATENT DOCUMENTS

| | | | |
|---|---|---|---|
| 5,627,752 A | 5/1997 | Buck et al. | |
| 5,790,976 A | 8/1998 | Boll et al. | |
| 5,815,824 A | 9/1998 | Saga et al. | |
| 5,913,917 A * | 6/1999 | Murphy | 701/123 |
| 6,181,991 B1 | 1/2001 | Kondo et al. | |
| 7,360,615 B2 | 4/2008 | Salman et al. | |
| 2009/0105897 A1* | 4/2009 | Breslau et al. | 701/29 |
| 2009/0114463 A1 | 5/2009 | DeVault | |
| 2009/0277701 A1 | 11/2009 | Soma et al. | |
| 2010/0017236 A1* | 1/2010 | Duddle et al. | 705/4 |
| 2010/0198508 A1* | 8/2010 | Tang | 701/210 |
| 2010/0235030 A1 | 9/2010 | Xue et al. | |
| 2010/0256846 A1 | 10/2010 | Shaffer | |

OTHER PUBLICATIONS

PCT International Search Report and Written Opinion for International Patent Application No. PCT/US2012/027208, May 30, 2012, 12 pages.
Abuelsamid, S., "GM and OnStar Launch Sophisticated Mobile App for Volt [w/videos]," Jan. 5, 2010, five pages. [Online] [Retrieved on May 19, 2010] Retrieved from the Internet <URL:http://www.autoblog.com/2010/01/05/gm-and-onstar-launch-sophisticated-mobile-app-for-volt/.>.
Daimler AG, "Mercedes-Benz F 800 Style: Efficiency Paired with Elegance," Mar. 2, 2010, three pages. [Online] [Retrieved on May 19, 2010] Retrieved from the Internet <URL:http://www.daimler.com.>.
Rana, O., "Nissan Launches Electric-vehicle Platform, Coming to U.S. in 2010 (w/video)," Jul. 27, 2009, four pages. [Online] [Retrieved on May 19, 2010] Retrieved from the Internet <URL:http://www.http://www.egmcartech.com/2009/07/27/nissan-launches-electric-vehicle-platform-coming-to-us-in-2010-wvideo/.>.

* cited by examiner

Primary Examiner — Thomas Tarcza
Assistant Examiner — Garrett Evans
(74) Attorney, Agent, or Firm — Fenwick & West LLP; Mark Duell

(57) ABSTRACT

During calibration trips driving characteristics of a driver are tracked. At the end of each calibration trip, a calibration profile is created for the trip that summarizes the trip and the driving characteristics of the driver during the trip. When the driver enters a destination where he or she wishes to travel to, a calibration profile with driving characteristics is identified. The identified calibration profile created for a calibration trip that is similar to a trip the driver will be taking to reach the destination. A determination is made as to whether the electric vehicle has enough energy to reach the destination assuming the driver expresses the same driving characteristics as those of the calibration profile while traveling to the destination.

27 Claims, 7 Drawing Sheets

| Throttle | Usage | Braking | Usage |
|---|---|---|---|
| 1-20% | | <0.2 g | |
| 21-39% | | 0.21-0.39 g | |
| 40-59% | | 0.4-0.59 g | |
| 60-79% | | 0.6-0.79 g | |
| 80-100% | | >0.8 g | |

FIG. 5

| Date | Time | Weather Conditions | Geographic Information | Accessory Vehicle Components Activated | Throttle | Braking | Battery Age | Start SOC/mileage | Stop SOC/mileage |
|---|---|---|---|---|---|---|---|---|---|
| 1/27/11 | Start: 10AM End: 10:20AM | Partly Cloudy 57°- 60° F | Starting Location: 111 Main St., Santa Clara, CA Ending Location: 222 Lincoln St., Mountain View, CA Traffic Conditions: Vehicles traveling at the speed limit | Defroster: 3% of the trip Headlights: 0% of the trip Radio: 100% of the trip | <20 % Throttle: 70% of trip 21-50 % Throttle: 30% of trip >50 % Throttle: 0% of trip | <0.2 g Braking: 20% of trip 0.21-.5 g Braking: 70% of trip 0.51-.8 g Braking: 10% of trip >.8 g Braking: 10% of trip | 2 years | 100% | 82% |

SYSTEM AND METHOD FOR PRECISE STATE OF CHARGE MANAGEMENT

FIELD OF THE EMBODIMENTS

The embodiments generally relate to electric vehicles and more particularly to determining whether an electric vehicle has enough energy to reach a destination.

BACKGROUND

Electric vehicles are vehicles that use one or more electric engines for propulsion of the vehicle. The electric engines are powered by rechargeable batteries on-board the vehicle. Because electric vehicles are powered by on-board batteries, their driving range is limited by the amount of charge in their batteries. Currently, the amount of electric charging stations is limited. Therefore, when a driver is planning to travel to a destination, it is important for the driver to know whether the vehicle has enough charge to reach the destination or whether the remaining charge should be used to reach the nearest charging station.

Current systems determine whether an electric vehicle can reach a destination based on whether the destination is within the driving range of the electric vehicle. The systems calculate the driving range of the vehicle by simply entering the current charge of the vehicle's batteries into a formula. However, many factors affect the driving range of a vehicle, such as how aggressive the driver is on the throttle, the driver's braking style, the terrain being driven on, and the vehicle components being used (e.g., air conditioner usage, defroster usage). The current systems do not take these factors into account when determining whether a vehicle can reach a destination. As a result, with the current system it is more likely that a driver may become stranded when attempting to travel to a destination.

Thus, there is a need for a way to be able to accurately determine whether a vehicle has enough energy to reach a destination.

SUMMARY

The embodiments provide a computer based method, a computer readable storage medium, and a vehicle system for determining whether an electric vehicle has sufficient energy to reach a destination. In some embodiment, during calibration trips driving characteristics of a driver are tracked. At the end of each calibration trip, a calibration profile is created for the trip that summarizes the trip and the driving characteristics of the driver during the trip. The calibration profile is stored.

When the driver enters a destination where he or she wishes to travel to, a calibration profile with driving characteristics is identified. The identified calibration profile identified created for a calibration trip that is similar to a trip the driver will be taking to reach the destination. A determination is made as to whether the electric vehicle has enough energy to reach the destination assuming the driver expresses the same driving characteristics as those of the calibration profile while traveling to the destination.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the present subject matter.

BRIEF DESCRIPTION OF THE DRAWINGS

FIG. 5 illustrates an example of a table where a calibration module may track driving characteristics of a driver during a calibration trip according to one embodiment.

FIG. 6 illustrates an example of a calibration profile where the profile is represented as a table according to one embodiment.

Figure 1:
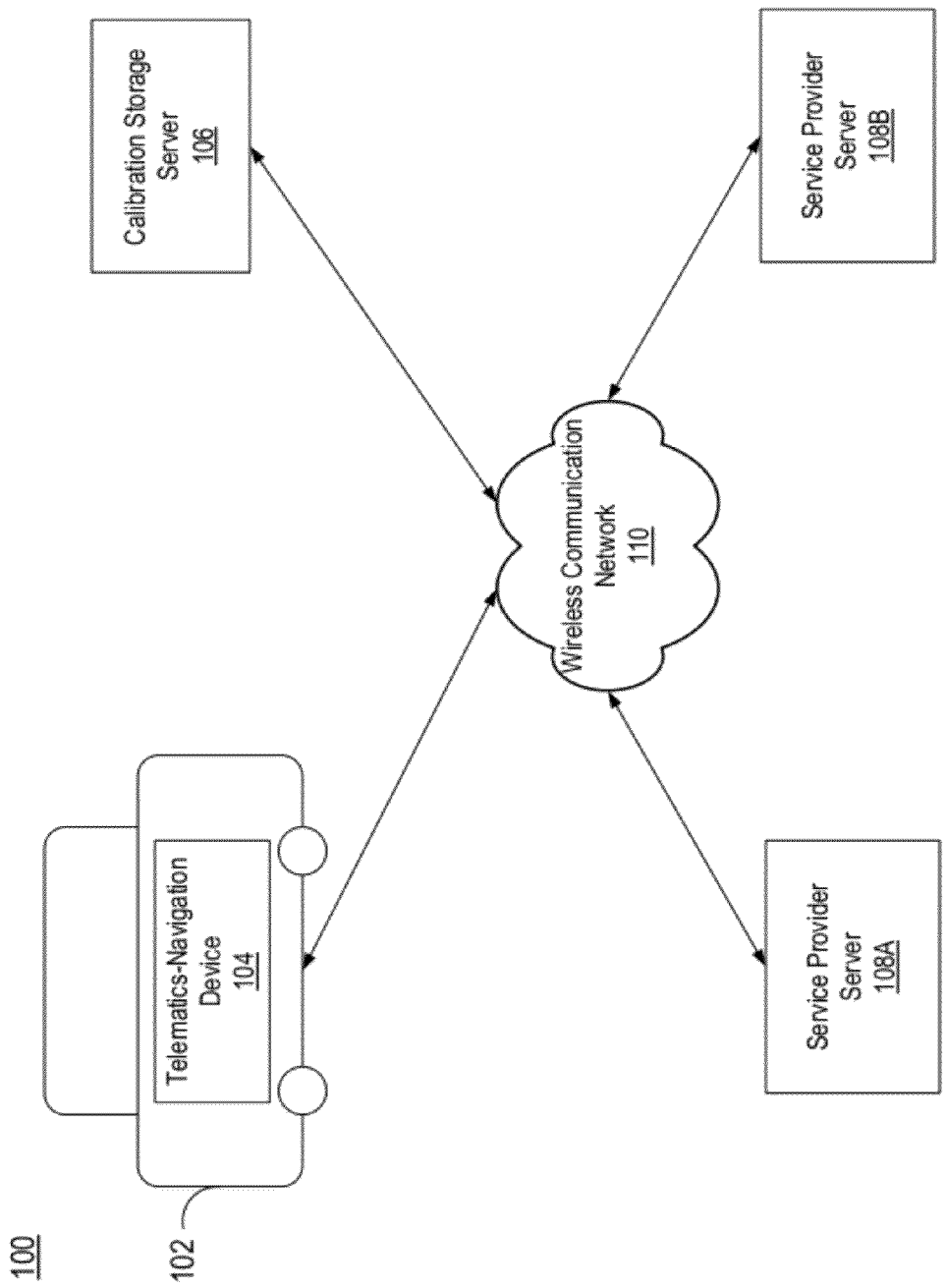
FIG. 1 is a high-level block diagram of a vehicle communication environment according to one embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

An embodiment is now described with reference to the figures where like reference numbers indicate identical or functionally similar elements. In the figures, a letter after a reference numeral, such as "108A," indicates that the text refers specifically to the element having that particular reference numeral. A reference numeral in the text without a following letter, such as "108," refers to any or all of the elements in the figures bearing that reference numeral (e.g. "108" in the text refers to reference numerals "108A," and/or "108B" in the figures). Also in the figures, the left most digits of each reference number correspond to the figure in which the reference number is first used.

Reference in the specification to "one embodiment" or to "an embodiment" means that a particular feature, structure, or characteristic described in connection with the embodiments is included in at least one embodiment. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the embodiments include process steps and instructions described herein in the form of an algorithm. It should be noted that the process steps and instructions of the embodiments could be embodied in software, firmware or hardware, and when embodied in software, could be downloaded to reside on and be operated from different platforms used by a variety of operating systems.

The embodiments also relates to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the embodiments are not described with reference to any particular programming language. It will be appreciated that a variety of programming languages may be used to implement the teachings of the embodiments, and any references below to specific languages are provided for enablement and best mode of the embodiments.

In addition, the language used in the specification has been principally selected for readability and instructional purposes, and may not have been selected to delineate or circumscribe the inventive subject matter. Accordingly, the embodiments are intended to be illustrative, but not limiting, of the scope of the embodiments, which is set forth in the claims.

FIG. 1 is a high-level block diagram of a vehicle communication environment 100 according to one embodiment. FIG. 1 illustrates an electric vehicle 102, a calibration storage server 106, and service provider servers 108 connected by a wireless communication network 110.

The electric vehicle 102 represents a vehicle that contains one or more electric engines for propulsion of the vehicle 102. The electric engines are powered by rechargeable batteries on-board the vehicle 102. The on-board batteries are charged when the vehicle 102 is connected to an outside power source. For example, the batteries may be charged by connecting the vehicle 102 to a charging station that draws power from a power grid. In one embodiment, the on-board batteries are also charged using regenerative braking. In one embodiment, the electric vehicle 102 is purely electric in that it only has an electric engine. In another embodiment, the electric vehicle 102 has both an electric engine and internal combustion engine. As used herein, the amount of energy remaining in the vehicle's batteries for propulsion of the vehicle 102 may be referred to as the energy of the vehicle 102, the vehicle's state of charge or the state of charge of the vehicle's batteries.

The electric vehicle 102 includes a telematics-navigation device 104. The telematics-navigation device 104 represents a device that determines whether the vehicle's batteries have enough energy to allow the vehicle 102 to reach a destination. The determination is made based on driving characteristics of the driver. During calibration trips, the telematics-navigation device 104 tracks the driving characteristics of the driver. The driving characteristics tracked by the telematics-navigation device 104 may be any characteristic that affects the amount of energy remaining in the vehicle's batteries (i.e., that affects the vehicle's state of charge), such as how aggressive the driver is on the vehicle's throttle or whether the driver turned on the defroster while en route. During a calibration trip, the telematics-navigation device 104 also tracks external factors that are out of the driver's control (i.e., uncontrollable by the driver) and may have an influence on the travel time of the trip or the driving range of the vehicle. These external factors may include weather conditions, traffic conditions, and the gradient of roads being traveled on.

At the end of a calibration trip, the telematics-navigation device 104 creates a calibration profile for the trip. The calibration profile summarizes the trip and the driving characteristics of the driver during the trip. The calibration profile may, for example, be a file that includes an identifier of the driver, the date, time, starting trip location, the ending trip location, the percentage of time that the air conditioner was on, the percentage of time that the defroster was on, the weather conditions, the traffic conditions, and information on how the driver used the throttle and brakes. The telematics-navigation device 104 transmits the calibration profile of the driver to the calibration storage server 106 via the wireless communication network 110 for storage.

When the driver enters a destination where he or she wishes to travel to, the telematics-navigation device 104 identifies a route to the destination. The telematics-navigation device 104 determines whether the vehicle's batteries have enough energy (i.e., charge) to allow the vehicle 102 to reach the destination via the route. To determine whether the vehicle 102 can reach the destination, the telematics-navigation device 104 generates a query that includes an identifier of the vehicle's current driver, information about the route (e.g., starting location, ending location) and external factors (e.g., current weather conditions and traffic location). The telematics-navigation device 104 transmits the query to the calibration storage server 106. The purpose of the information included in the query is for the calibration storage server 106 to be able to find a calibration profile for a calibration trip that was very similar to the trip that vehicle 102 will be taking to reach the destination.

In response to the transmittal of the query, the telematics-navigation device 104 receives from the calibration storage server 106 a calibration profile that best matches the query (i.e., the closest match to the query). The calibration profile created as a result of a calibration trip taken by the driver. The calibration profile includes driving characteristics of the driver during the calibration trip. Since the calibration trip was similar to the trip the driver will be taking to the destination, the telematics-navigation device 104 can predict that while traveling to the destination, the driver will express the same driving characteristics as in the calibration profile. Based on driving characteristics included in calibration profile, the telematics-navigation device 104 determines whether the vehicle 102 has enough energy to reach the destination assuming the driver expresses the same driving characteristics as those of the calibration profile.

If a determination is made that the vehicle 102 does not have enough energy to reach the destination, the telematics-navigation device 104 determines whether the vehicle 102 can reach the destination if the driver changes his or her expected driving characteristics. If changes can be made, the telematics-navigation device 104 notifies the driver of the changes that must be made to his or her driving characteristics in order to reach the destination. The telematics-navigation device 104 provides the driver with directions to the destination.

As an example, assume that a driver of the vehicle 102 enters a destination to where he or she wishes to travel to in the vehicle 102. The telematics-navigation device 104 identifies a route and obtains information on the current weather conditions and traffic conditions along the route from the service provider servers 108. The telematics-navigation device 104 transmits a query to the calibration storage server 106 that includes an identifier of the driver, the current location of the vehicle 102, the destination, the route, the current time and day of the week, the weather conditions, and the traffic conditions. The telematics-navigation device 104 receives from the calibration storage server 106 a calibration profile for a calibration trip taken by the driver along a similar route, at around the current time, on the same day of the week, and under the same weather conditions.

Assume that the driving characteristics included in the profile indicate that during the calibration trip the driver had the air conditioning on for 50% of the trip, the air conditioning was set at 67° F., and that the driver's use of the throttle and brakes was normal. Based on the characteristics of the profile, the telematics-navigation device 104 determines the amount of charge that would be needed to reach the destination if the driver has the air conditioning on for 50% of the time at 67° F. and the driver's use of the throttle and brakes is normal. If the amount of charge needed to reach the destination is more than the vehicle's current state of charge, the telematics-navigation device 104 may notify the driver that if he opens his window instead of using the air conditioning he will be able to reach the destination with the vehicle's current state of charge.

The calibration storage server 106 represents an entity that stores calibration profiles of drivers and responds to queries received from the telematics-navigation device 104. When the calibration storage server 106 receives a calibration profile of a driver from the telematics-navigation device 104, the calibration server 106 stores the calibration profile.

When the calibration storage server 106 receives a query from the telematics-navigation device 104, the calibration server 106 identifies a driver identifier included in the query. The identifier may be, for example, the driver's full name or an identification number assigned to the driver. The calibration storage server 106 searches the stored calibration profiles using the identifier and identifies the driver's stored calibration profiles. From the calibration profiles identified, the calibrations storage server 106 selects a calibration profile that best matches the query. In one embodiment, the more terms of the query that are included in the calibration profile, the better the match. In one embodiment, certain terms in the query have more weight than others for determining the best match. For example, it may be that if the starting and ending location match, that is given more weight than if the traffic conditions match. The calibration storage server 106 transmits the selected calibration profile to the telematics-navigation device 104 via the wireless communication network 110.

The service provider servers 108A and 108B represent entities that perform services for the electric vehicle 102. In one embodiment, the service provider servers 108 provide vehicle's telematics-navigation device 104 with information on external factors that are out of the driver's control. In one embodiment, information provided to the telematics-navigation device 104 includes information on the gradient of roads that will be traveled on or are being traveled on as part of the trip. In one embodiment, information provided to the telematics-navigation device 104 includes the current weather conditions and traffic conditions along a route that will be traveled or is being traveled as part of the trip.

In one embodiment, the weather conditions provided to the telematics-navigation device 104 for a route include one or more of the following: temperature, current condition (e.g., cloudy, partly cloudy, sunny, showers, snowing, etc), rate of rain or snow fall, wind speed, and wind direction. In one embodiment, the traffic conditions provided to the telematics-navigation device 104 for a route include one or more of the following: the current average speed of vehicles, a congestion level that represents the amount of congestion, an indication of whether there is an accident and the location of the accident. It should be understood that even though only two service provider servers 108 are shown in FIG. 1, any number of service provider servers 108 can be connected to the wireless communication network 110.

The wireless communication network 110 represents a communication pathway between the electric vehicle 102, the calibration storage server 106, and the service provider servers 108. In one embodiment, the wireless communication network 110 is a cellular network comprised of multiple base stations, controllers, and a core network that typically includes multiple switching entities and gateways. In one embodiment, the wireless communication network 110 is a wireless local area network (WLAN) that provides wireless communication over a limited area. In one embodiment, the WLAN includes an access point that connects the WLAN to the Internet. In one embodiment, the wireless communication network 110 is a combination of these.

Figure 2:
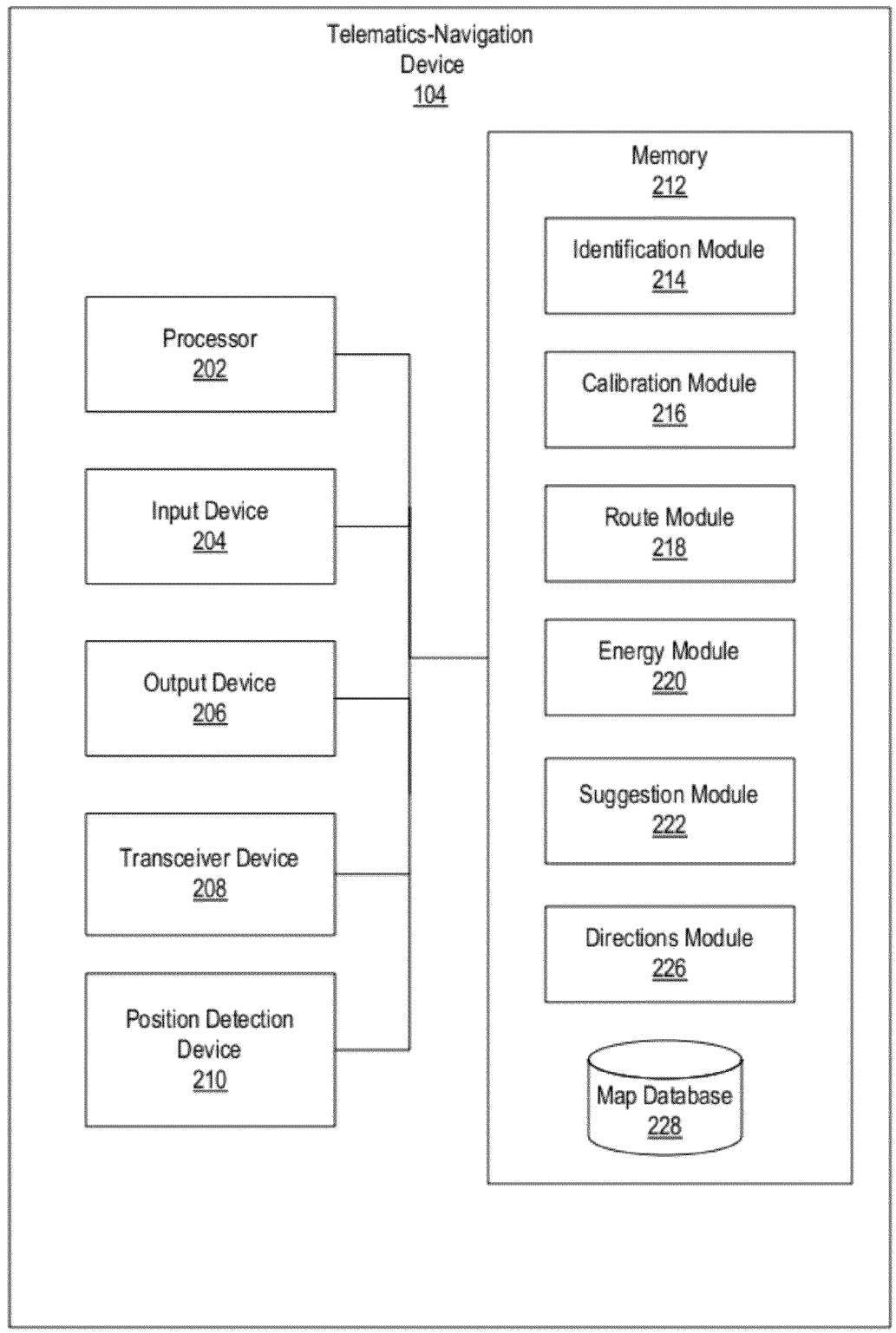
FIG. 2 is a high-level block diagram illustrating a detailed view of a telematics-navigation device according to one embodiment.

FIG. 2 is a high-level block diagram illustrating a detailed view of the telematics-navigation device 104 according to one embodiment. The telematics-navigation device 104 includes a processor 202, an input device 204, an output device 206, a transceiver device 208, a position detection device 210, and a memory 212.

The processor 202 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2, multiple processors may be included. The processor 202 comprises an arithmetic logic unit, a microprocessor, a general purpose computer, or some other information appliance equipped to transmit, receive and process electronic data signals from the memory 212, the input device 204, the output device 206, the transceiver device 208, or the position detection device 210.

The input device 204 is any device configured to provide user input to the telematics-navigation device 104 such as, a cursor controller or a keyboard. In one embodiment, the input device 204 can include an alphanumeric input device, such as a QWERTY keyboard, a key pad or representations of such created on a touch screen, adapted to communicate information and/or command selections to processor 202 or memory 212. In another embodiment, the input device 204 is a user input device equipped to communicate positional data as well as command selections to processor 202 such as a joystick, a mouse, a trackball, a stylus, a pen, a touch screen, cursor direction keys or other mechanisms to cause movement adjustment of an image.

The output device 206 represents any device equipped to display electronic images and data as described herein. Output device 206 may be, for example, an organic light emitting diode display (OLED), liquid crystal display (LCD), cathode ray tube (CRT) display, or any other similarly equipped display device, screen or monitor. In one embodiment, output device 206 is equipped with a touch screen in which a touch-sensitive, transparent panel covers the screen of output device 206. In one embodiment, the output device 206 is equipped with a speaker that outputs audio as described herein.

The transceiver device 208 represents a device that allows the telematics-navigation device 104 to communicate with entities via the wireless communication network 110. The transceiver device 208 is used by the telematics-navigation device 104 to communicate with the calibration storage server 106 and the service provider servers 108.

The position detection device 210 represents a device that communicates with a plurality of positioning satellites (e.g., GPS satellites) to determine the geographical location of the electric vehicle 102. In one embodiment, to determine the location of the vehicle 102, the position detection device 210 searches for and collects GPS information or signals from four or more GPS satellites that are in view of the position detection device 210. Using the time interval between the broadcast time and reception time of each signal, the position detection device 210 calculates the distance between the vehicle 102 and each of the four or more GPS satellites. These distance measurements, along with the position and time information received in the signals, allow the position detection device 210 to calculate the geographical location of the vehicle 102.

The memory 212 stores instructions and/or data that may be executed by processor 202. The instructions and/or data may comprise code for performing any and/or all of the techniques described herein. Memory 212 may be a dynamic random access memory (DRAM) device, a static random access memory (SRAM) device, Flash RAM (non-volatile storage), combinations of the above, or some other memory device known in the art. The memory 212 includes a plurality of modules adapted to communicate with the processor 202, the input device 204, the output device 206, the transceiver device 208, and/or the position detection device 210.

An identification module 214 identifies the driver of the vehicle 102. The vehicle 102 may be operated by a number of drivers. For example, if the vehicle 102 belongs to a husband and wife, the typical drivers will be the husband and the wife. In one embodiment, when a calibration drive is initiated or a destination is entered as to where the driver of the vehicle 102 wishes to travel to, the identification module 214 determines who the driver of the vehicle 102 is for the current trip. In one embodiment, the identification module 214 determines who the current driver is by presenting to the current driver a list of possible drivers and having the driver select his or her name from the list. In another embodiment, the identification module 214 determines who the current driver is by having the driver enter his or her name or an identification number assigned to the driver.

In one embodiment, each driver of the vehicle 102 has their own unique key with a radio frequency identification (RFID) tag. The RFID tag stores an identification number assigned to the driver. When a calibration drive is initiated or a destination is entered, the identification module 214 determines the current driver of the vehicle 102 by transmitting a signal to the RFID tag of the driver's key via the transceiver device 203. In response, the RFID tag transmits to the identification module 214 a signal that includes the driver's identification number. In one embodiment, the identification information obtained by the identification module 214 is used by the calibration module 216 and the energy module 220 as is described below.

A calibration module 216 tracks driving characteristics of drivers during calibration trips. A calibration trip is a route taken by a driver of the vehicle 102 from a starting location to an ending location, where during travel along the route the calibration module 216 tracks driving characteristics of the vehicle's driver. The calibration module 216 initiates a calibration trip when an initiating event is detected. In one embodiment, an initiating event includes one or more of the following: the driver turning on the vehicle 102, a destination being received of where the driver wishes to travel to, and the vehicle 102 being disconnected from an outside power source charging the vehicle 102.

When an initiating event is detected, the calibration module 216 continuously tracks driving characteristics of the driver during the initiated calibration trip. The driving characteristics tracked by the calibration module 216 during a calibration trip are characteristics of the driver that affect the amount of charge remaining in the vehicle's batteries. In one embodiment, the driving characterizes tracked for the driver include one or more of the following: use of the throttle, use of the brakes, and accessory vehicle components used by the driver.

An accessory vehicle component is a vehicle component that is not needed for propulsion of the vehicle, but uses battery charge to operate. Accessory vehicle components are typically included in a vehicle for safety purposes or to provide comfort for the driver. Examples of accessory vehicle components include air conditioning system, defroster, wiper blades, head lights, and seat warmers.

FIG. 5 illustrates an example of a table 500 where the calibration module 216 may track the use of the throttle and brakes during a calibration trip. Column 502 represents the percentage of the throttle that is open and in column 504 the openness of the throttle is tracked during the calibration trip. Column 506 represents the amount of g-forces created by braking and in column 508 braking is tracked during the calibration trip.

In one embodiment, along with the driving characteristics, during the calibration trip the calibration module 216 also tracks external factors that are out of the driver's control and may have an influence on the travel time of the trip or the driving range of the vehicle. In one embodiment, the factors tracked include the weather conditions, traffic conditions, and the gradient of roads being traveled on. In one embodiment, as the vehicle 102 is traveling, each time the vehicle 102 starts traveling on a different road, the calibration module 216 requests from one or more service provider servers 108 current weather conditions, current traffic conditions, and gradient information for the road being traveled on. In another embodiment, as the vehicle 102 is traveling, the calibration module 216 obtains information periodically from the service provider servers 108 (e.g., every 10 miles or every 10 minutes).

The calibration module 216 continues to track driving characteristics and factors until a termination event is detected. The termination event ends the calibration trip. In one embodiment, a termination includes one or more of the following: the vehicle 102 being turned off, the vehicle 102 reaching a destination, the vehicle 102 being connected to an outside power source for charging.

Once the termination event is detected, the calibration module 216 creates a calibration profile for the calibration trip. The calibration profile summarizes the trip and the driver's driving characteristics of the driver during the trip. In one embodiment, in addition to a summary of the driver's driving characteristics, the calibration module 216 includes in the calibration profile one or more of the following: an identifier of the driver determined by the identification module 214, the date, the day of the week, the time at the start of the calibration trip, the age of the vehicle's batteries (i.e., how long the batteries have been used in the vehicle 102), the state of charge of the vehicle 102 at the start of the trip, the state of charge at the end of the trip, and information on factors that may have had an effect on the trip. FIG. 6 illustrates an example of a calibration profile where the profile is represented as a table 600.

The calibration module 216 transmits the calibration profile for the trip to the calibration storage server 106 for storage. In one embodiment, if a similar calibration profile is already stored for the driver (i.e., the driver has expressed very similar driving characteristics during a previous calibration trip), the new calibration profile is deleted. In another embodiment, if a similar calibration profile is already stored for the driver, the calibration module 216 replaces the stored calibration profile with the new calibration profile transmitted by the calibration module 216. In one embodiment, if a similar calibration profile is already stored, the calibration module combines the stored calibration profile and the new calibration profile.

A route module 218 selects a route for the vehicle 102 to travel to a destination. When the route module 218 receives from a driver a destination to where he or she wishes to travel to in the vehicle 102, the route module 218 requests from the position detection module 210 the current geographic location of the vehicle 102. In one embodiment, the destination is received in a request for directions to the destination. In another embodiment, the destination is received in a request for a determination as to whether the vehicle 102 has enough charge to reach the destination. Based on the current location and the destination, the route module 218 retrieves a map from a map database 228. The map database 228 includes multiple maps. In one embodiment, the maps stored in the map database 228 are vector maps. The route module 218 locates the current location and the destination on the map. The route module 218 identifies multiple routes from the current location to the destination.

The route module 218 selects one of the identified routes for traveling to the destination. In one embodiment, the route module 218 selects the route based on user criteria, such as the fastest route, the shortest distance route, the most direct route, the least congested route, a street dominant route, or a highway dominant route. In another embodiment, the route module 218 presents the identified routes to the user and allows the user to select a route. The route selected by the route module 218 is used by the energy module 220 and the directions module 226 as is described below.

An energy module 220 determines whether the vehicle's batteries have enough energy to reach a destination. When a destination is received of where the driver of the vehicle 102 wish to travel to, the energy module 220 receives from the route module 218 a route selected for traveling to the destination. In one embodiment, the destination is received in a request for directions to the destination. In another embodiment, the destination is received in a request for a determination as to whether the vehicle 102 has enough charge to reach the destination. The energy module 220 obtains from one or more service provider servers 108 information on external factors that are out of the driver's control and may have an influence on the travel time of the trip to the destination or the driving range of the vehicle (e.g., weather conditions, traffic conditions, and gradient information for the roads).

The energy module 220 creates a query that includes an identifier of the driver determined by the identification module 214, information about the route, and external factors. In one embodiment, the information about the route included in the query may be one or more of the following: the starting location, destination, the route itself (i.e., which roads will be traveled on and for what distance), the date, the current day of the week, the current time. The energy module 220 transmits the created query to the calibration storage server 106.

The energy module 220 receives in response to the transmittal of the query, a calibration profile from the calibration storage server 106. The calibration profile includes driving characteristics of the driver during a calibration trip. The energy module 220 determines the amount of battery charge that the vehicle 102 will consume if the driver expresses the profile's driving characteristics while driving to the destination. For example, the energy module 220 determines the amount of charge that the vehicle 102 will consume if the driver has the radio on during the whole trip, has the air conditioner on for 50% of the trip, and is aggressive on the throttle. The energy module 220 also determines the amount of charge that the vehicle 102 will gain if the driver expresses the profile's driving characteristic while driving to the destination. For example, the amount of charge that will be gained from braking, if the driver frequently panic breaks.

Based on the determined amount of charge that will be consumed and the charge that will be gained, the energy module 220 calculates the amount of charge that the vehicle's batteries currently need to have in order to be able to reach the destination. The energy module 220 determines whether the calculated amount of charge is greater than the current state of charge of the vehicle 102. If the calculated amount of charge is greater than the current state of charge, the energy module 220 notifies the driver via the output device 206 that the vehicle 102 will not be able to reach the destination with its current state of charge. In one embodiment, if the calculated amount of charge is less than the current state of charge, the energy module 220 notifies the driver that the vehicle 102 has enough charge to reach the destination. In another embodiment, the energy module 220 notifies the driver that the vehicle 102 has enough charge to reach the destination, if the calculated amount of charge is less than the current state of charge by a set amount.

In one embodiment, the energy module 220 uses the calibration profile to estimate the total amount of miles that the vehicle 102 will be able to travel with the vehicle's current charge if the driver drives according to the profile's driving characteristics (i.e., determines the vehicle's driving range). The energy module 220 presents the vehicle's driving range to the driver. In one embodiment, the energy module 220 also presents to the driver what the driving range of the vehicle 102 will be after the destination is reached.

In one embodiment, in addition to determining whether vehicle 102 will be able to reach the destination, the energy module 220 determines whether the vehicle 102 has enough charge to travel to a subsequent destination once the vehicle 102 arrives at the original destination. The energy module 220 notifies the driver about whether the vehicle 102 will be able to reach the subsequent destination. In one embodiment, the subsequent destination may be the nearest charging station, a subsequent destination entered by the driver, or the driver's home. In one embodiment, for the route from the original destination to the subsequent destination, the energy module 220 obtains another calibration profile in order to be able to determine whether the vehicle 102 has enough charge to reach the subsequent destination.

In one embodiment, as the vehicle 102 travels to the original destination provided by the driver, the energy module 220 tracks the driver's current driving characteristics. The energy module 220 determines whether the driver is driving according to the driving characteristics of the calibration profile (i.e., whether the driver's current driving characteristics deviate from the driving characteristics of the calibration profile). If the energy module 220 determines that the driver's current driving characteristics deviate from those of the calibration profile, the energy module 220 creates a new query. For example, if the profile indicates that the driver is typically light on the throttle, but the driver is actually being aggressive on the throttle, the energy module 220 determines that the current characteristics of the driver deviate from those of the profile and may create a new query. In one embodiment, the energy module 220 creates the new query if specific current driving characteristics of the driver deviate from those of the profile. In one embodiment, the energy module 220 creates the new query if current driving characteristics of the driver deviate from those of the profile for a set amount of time.

In one embodiment, in the new query created, the energy module 220 includes the identifier of the driver, information about the route, external factors, and the current driving characteristics of the driver. The energy module 220 transmits the new query to the calibration storage server 106. In response to transmitting the new query, the energy module 220 receives a new calibration profile for a calibration trip in which the driver expressed driving characteristics that are more in line with the driver's current driving characteristics. The energy module 220 determines whether the vehicle 102 has enough charge to reach the destination and determines the vehicle's current driving range based on the driving characteristics included in the new profile. The energy module 220 notifies the driver accordingly and presents the current driving range to the driver.

A suggestion module 222 determines modifications that can be made to a driver's driving characteristics in order to be able to reach a destination. In one embodiment, when the energy module 220 determines that the vehicle 102 will not be able to reach a destination if the driver drives according to a calibration profile's driving characteristics, the suggestions module 222 determines which of the driving characteristics can be modified in order to reach the destination with the vehicle's current state of charge.

In one embodiment, to determine which of the characteristics can be modified, the suggestion module 222 identifies each driving characteristic included in the calibration profile. For each driving characteristic, the suggestion module 222 determines whether changes can be made to the driver's characteristic in order to be able to reach the destination with the current state of charge. For example, assume that the calibration profile indicates that the driver will have the air conditioning on for the whole trip and set at 67° F., the suggestion module 222 may determine that if driver instead has the air conditioning on for only half the trip and set at 70° F., the vehicle 102 will be able to reach the destination with its current state of charge. The suggestion module 222 notifies the driver of the changes that can be made to certain driving characteristics in order to be able to reach the destination.

If the suggestion module 222 determines that no changes can be made to the driver's driving characteristics that would allow the vehicle 102 to reach the destination with its current state of charge, the suggestion module 222 uses the maps in the map database 228 to identify charging stations near the vehicle's current location. The suggestion module 222 notifies the driver that the vehicle 102 cannot reach the destination with the vehicle's current state of charge and that the driver should go to a charging station prior to traveling to the destination. The suggestion module 222 presents to the driver the identified charging stations near the vehicle's current location.

A directions module 226 provides drivers with directions to destinations. When a driver requests directions to a destination, the directions module 226 identifies the route selected by the route module 218. The directions module 226 provides the driver of the vehicle 102 with turn by turn directions along the selected route until the destination is reached. As the vehicle 102 is traveling to the destination, if the vehicle 102 strays from the route, the directions module 226 receives from the route module 218 a new route from the current location of the vehicle 102 to the destination. The direction module 230 provides turn by turn directions along the new route.

Some of the functionality described herein with regards to the telematics-navigation device 104 may be performed by a remote server coupled to the wireless communication network 110. For example, the telematics-navigation device 104 may initiate calibration trips and create calibration profiles, but when a destination is entered by the driver, the remote server may use the calibration profiles to determine whether the vehicle 102 has enough energy to reach the destination.

It should be apparent to one skilled in the art that the telematics-navigation device 104 may include more or less components than those shown in FIG. 2 without departing from the spirit and scope of the embodiments. For example, the telematics-navigation device 104 may include additional memory, such as, for example, a first or second level cache, or one or more application specific integrated circuits (ASICs). Similarly, telematics-navigation device 104 may include additional input or output devices. In some embodiments one or more of the components can be positioned in close proximity to each other while in other embodiments these components can be positioned in different locations. For example the units in memory 212 of the telematics-navigation device 104 can be programs capable of being executed by one or more processors located in other devices in the electric vehicle 102.

Figure 3:
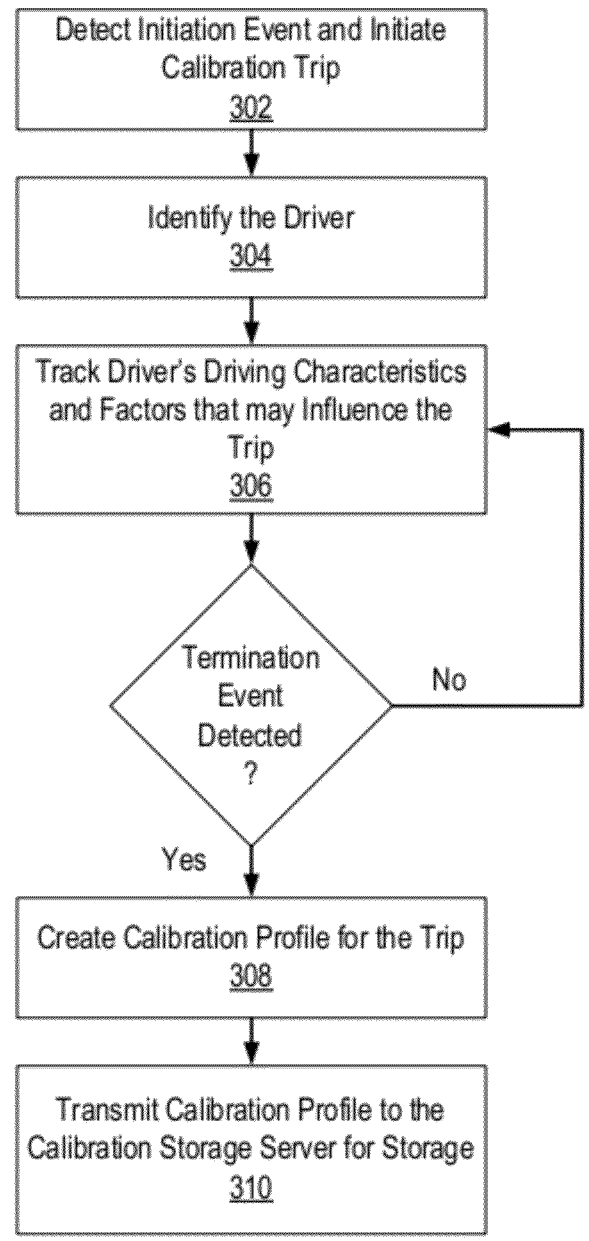
FIG. 3 is a flow chart of a method for tracking driving characteristics of a driver during a calibration trip according to one embodiment.

FIG. 3 is a flow chart 300 of a method for tracking driving characteristics of a driver during a calibration trip according to one embodiment. In one embodiment, the steps of the method are implemented by the processor 202 of the telematics-navigation device 104 executing instructions that cause the desired actions. Those of skill in the art will recognize that one or more of the method steps may be implemented in embodiments of hardware and/or software or combinations thereof. For example, instructions for performing the described actions are embodied or stored within a computer readable medium. Furthermore, those of skill in the art will recognize that other embodiments can perform the steps of FIG. 3 in different orders. Moreover, other embodiments can include different and/or additional steps than the ones described here.

Assume for purposes of this example that an initiation event occurs. The telematics-navigation device 104 detects 302 the initiation event and as a result initiates a calibration trip. The telematics-navigation device 104 identifies 304 the current driver of the vehicle 102. During the calibration trip, the telematics-navigation device 104 tracks 306 driving characteristics of the driver and external factors that are out of the driver's control. The telematics-navigation device 104 continues to track driving characteristics and factors until a termination event is detected.

Once a termination event is detected, the telematics-navigation device 104 creates 308 a calibration profile for the trip. The calibration profile summarizes the trip and the driving characteristics of the driver during the trip. The telematics-navigation device 104 transmits 310 the calibration profile of the driver to the calibration storage server 106 for storage.

Figure 4A:
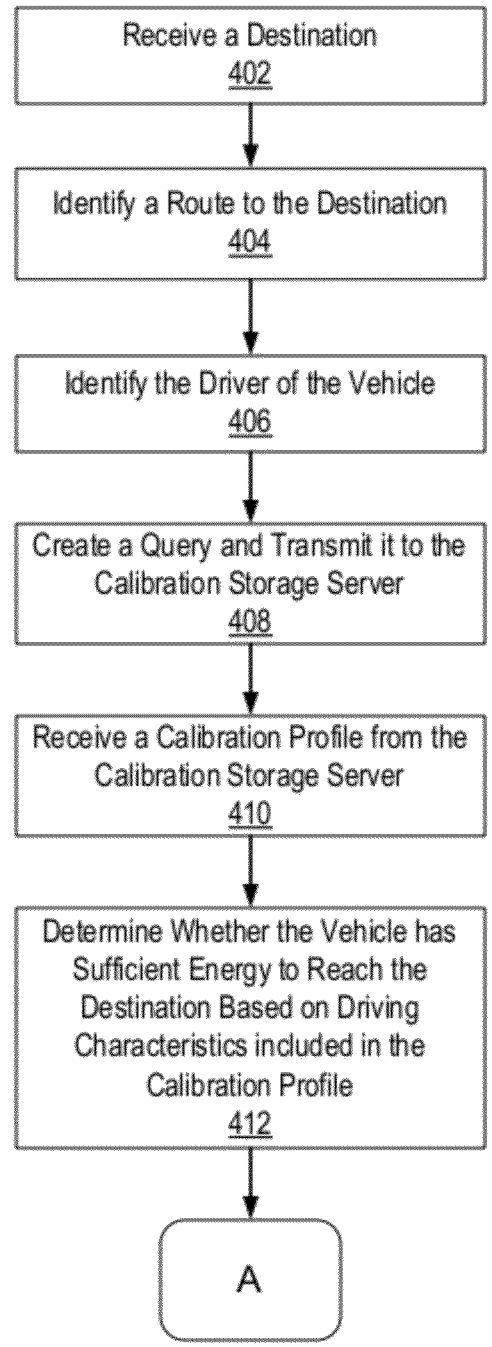
FIG. 4 is a flow chart of a method for determining whether the vehicle has enough energy to reach a destination.
Figure 4B:
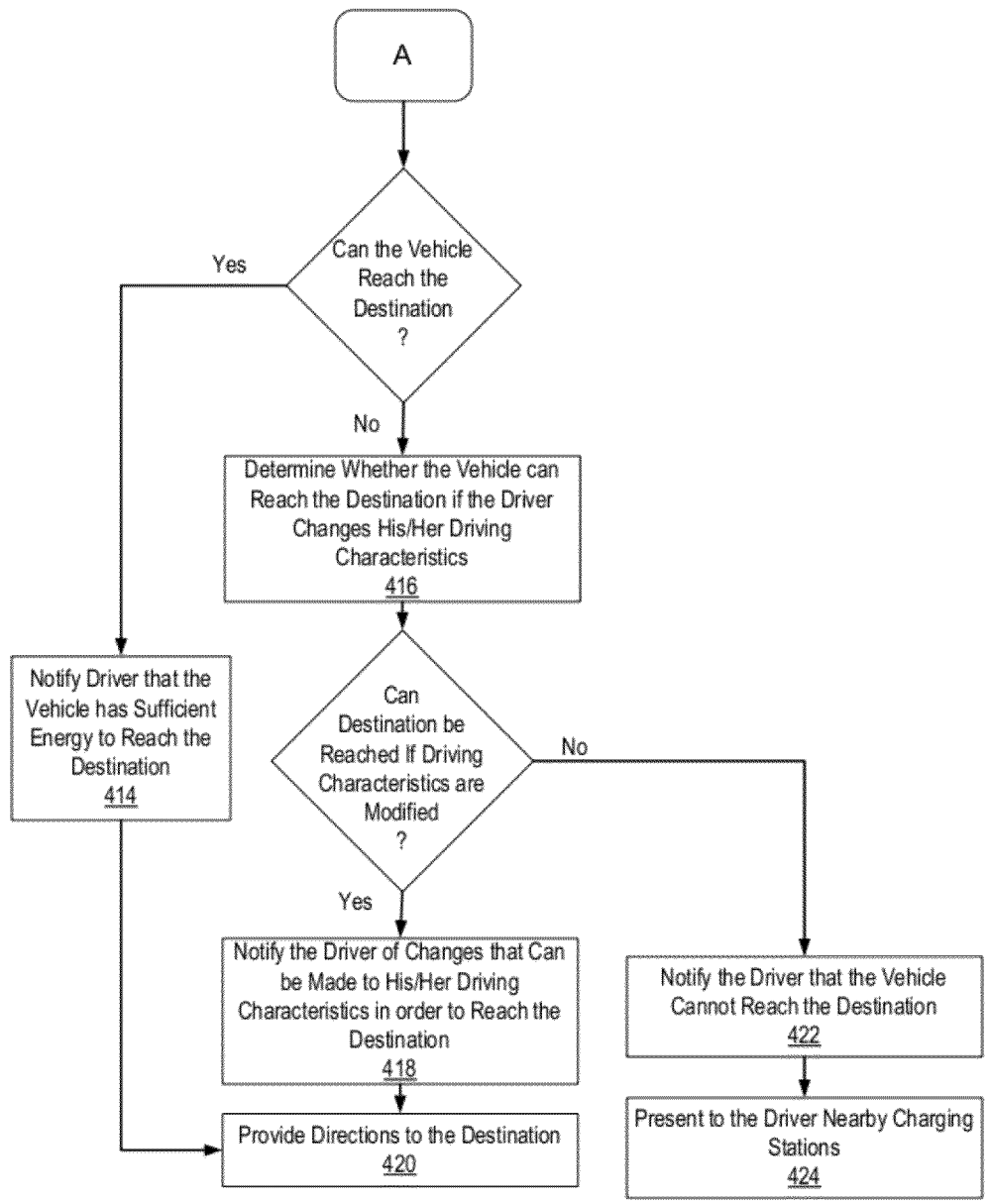

FIG. 4 is a flow chart 400 of a method for determining whether the vehicle 102 has enough energy to reach a destination. In one embodiment, the steps of the method are implemented by the processor 202 of the telematics-navigation device 104 executing instructions that cause the desired actions. Those of skill in the art will recognize that one or more of the method steps may be implemented in embodiments of hardware and/or software or combinations thereof. For example, instructions for performing the described actions are embodied or stored within a computer readable medium. Furthermore, those of skill in the art will recognize that other embodiments can perform the steps of FIG. 4 in different orders. Moreover, other embodiments can include different and/or additional steps than the ones described here.

The telematics-navigation device 104 receives 402 a destination from a driver of where the driver wishes to travel to in the vehicle 102. The telematics-navigation device 104 identifies 404 a route to the destination and identifies 406 the current driver of the vehicle 102. The telematics-navigation device 104 creates 408 a query and transmits it to the calibration storage server 106. The query created includes an identifier of the driver, information about the route, and external factors.

In response to the transmittal of the query, the telematics-navigation device 104 receives 410 a calibration profile from the calibration storage server 106. The calibration profile includes driving characteristics of the driver captured during a calibration trip. The telematics-navigation device 104 expects the driver to engage in the same driving characteristics on the trip to the destination. Based on the driving characteristics included in the calibration profile, the telematics-navigation device 104 determines 412 whether the vehicle's batteries have enough energy to allow the vehicle 102 to reach the destination. If it is determined that the vehicle 102 has enough energy to reach the destination, the telematics-navigation device 104 notifies 414 the driver and provides 420 the driver with turn by turn direction to the destination.

On the other hand, if it is determined that the vehicle 102 will not be able to reach the destination if the driver engages in the expected driving characteristics of the profile, the telematics-navigation device 104 determines 416 whether the vehicle 102 can reach the destination if the driver changes his or her expected driving characteristics. If it is determined that the vehicle 102 can reach the destination if the driver changes his or her expected driving characteristics, the telematics-navigation device 104 notifies 418 the driver of changes that can be made to his or her driving characteristics in order to be able to reach the destination. The telematics-navigation device 104 provides 420 the driver with turn by turn direction to the destination.

If it is determined that the vehicle 102 will not be able to reach the destination even if the driver changes his or her expected driving characteristics, the telematics-navigation device 104 notifies 422 the driver that the vehicle 102 does not have enough energy to reach the destination. The telematics-navigation device 104 presents 424 to the driver charging stations that are near the current location of the vehicle 102.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the embodiments present disclosure without departing from the spirit and scope of the disclosure.

The invention claimed is:

1. A computer-implemented method comprising:
storing a plurality of profiles associated with a first driver that has been identified as not anonymous, each profile including driving characteristics of the first driver during one of a plurality of prior trips;
determining that the first driver is operating an electric vehicle;
receiving a destination for a current trip by the first driver of the electric vehicle from a starting location to the destination;
determining whether the electric vehicle has enough energy to reach the destination along a route based on driving characteristics included in a first profile from the plurality of profiles, the first profile describing driving characteristics of the first driver during a first prior trip from the plurality of prior trips;
tracking driving characteristics of the first driver during the current trip along the route;
determining whether the tracked driving characteristics of the first driver along the route of the current trip deviate from the driving characteristics included in the first profile; and
responsive to determining that the tracked driving characteristics deviate from the driving characteristics included in the first profile, determining whether the electric vehicle has enough energy to reach the destination along the route based on a second profile from the plurality of profiles, the second profile including driving characteristics of the first driver during a second prior trip from the plurality of trips that best match the tracked driving characteristics.

2. The method of claim 1, wherein the tracked driving characteristics comprise characteristics of the first driver that affect the amount of energy remaining in a battery of the vehicle.

3. The method of claim 1, wherein the tracked driving characteristics include one or more of the following: use of brakes of the vehicle, use of a throttle of the vehicle, and use of an accessory vehicle component that operates using energy of a vehicle battery.

4. The method of claim 1, further comprising:
tracking during the current trip one or more external factors that are out of the control of the first driver and may have an influence on a travel time of the current trip or a driving range of the vehicle.

5. The method of claim 4, wherein the tracked external factors include one or more of the following: weather conditions, traffic conditions, and gradient of roads traveled on by the vehicle.

6. The method of claim 1, further comprising:
creating a third profile that summarizes the current trip and the tracked driving characteristics; and
transmitting the third profile for storage.

7. The method of claim 1, further comprising:
responsive to receiving the destination for the current trip, identifying the route to the destination;
generating a query that includes first driver information and route information;
receiving the first profile as the best match to the query from the plurality of profiles of the first driver, the first profile summarizing the driving characteristics tracked during the first prior trip; and
determining whether the vehicle has enough energy to reach the destination based on the driving characteristics of the first profile.

8. The method of claim 1, further comprising:
determining whether the vehicle has enough energy to travel to a subsequent destination after reaching the destination.

9. The method of claim 1, further comprising:
responsive to determining that the vehicle cannot reach the destination assuming the first driver drives according to the tracked driving characteristics of the current trip, determining a modification to one or more of the driving characteristics that will allow the vehicle to reach the destination; and
notifying the first driver of the modification.

10. The method of claim 1, further comprising:
determining a driving range of the vehicle based on the first profile; and
notifying the first driver of determined the driving range.

11. A non-transitory computer-readable storage medium having computer-executable code comprising:
a calibration module configured to store a plurality of profiles associated with a first driver that has been identified as not anonymous, each profile including driving characteristics of the first driver during one of a plurality of prior trips;
an identification module configured to determine that the first driver is operating an electric vehicle;
a route module configured to receive a destination for a current trip by the first driver of the electric vehicle from a starting location to the destination; and
an energy module configured to:
determine whether the electric vehicle has enough energy to reach the destination along a route based on driving characteristics included in a first profile from the plurality of profiles, the first profile describing driving characteristics of the first driver during a first prior trip from the plurality of prior trips;
track driving characteristics of the first driver during the current trip along the route;
determine whether the tracked driving characteristics of the first driver along the route of the current trip deviate from the driving characteristics included in the first profile; and
responsive to determining that the tracked driving characteristics deviate from the driving characteristics included in the first profile, determine whether the electric vehicle has enough energy to reach the destination along the route based on a second profile from the plurality of profiles, the second profile including driving characteristics of the first driver during a second prior trip from the plurality of trips that best match the tracked driving characteristics.

12. The non-transitory computer-readable storage medium of claim 11, wherein the tracked driving characteristics comprise characteristics of the first driver that affect the amount of energy remaining in a battery of the vehicle.

13. The non-transitory computer-readable storage medium of claim 11, wherein the tracked driving characteristics include one or more of the following: use of brakes of the vehicle, use of a throttle of the vehicle, and use of an accessory vehicle component that operates using energy of a vehicle battery.

14. The non-transitory computer-readable storage medium of claim 11, wherein the calibration module is further configured to track during the current trip one or more external factors that are out of the control of the first driver and may have an influence on a travel time of the current trip or a driving range of the vehicle.

15. The non-transitory computer-readable storage medium of claim 11, further comprising:
the route module further configured to identify the route to the destination responsive to receiving the destination for the current trip; and
the energy module further configured to:
generate a query that includes first driver information and route information;
receive the first profile as the best match to the query from the plurality of profiles of the first driver, the first profile summarizing the driving characteristics tracked during the first prior trip; and
determine whether the vehicle has enough energy to reach the destination based on the driving characteristics of the first profile.

16. The non-transitory computer-readable storage medium of claim 11, the energy module further configured to determine whether the vehicle has enough energy to travel to a subsequent destination after reaching the destination.

17. The non-transitory computer-readable storage medium of claim 11, further comprising:
a suggestion module configured to:
determine a modification to one or more of the tracked driving characteristics that will allow the vehicle to reach the destination, responsive to determining that the vehicle cannot reach the destination; and
notify the first driver of the modification.

18. The non-transitory computer-readable storage medium of claim 11, the energy module further configured to:
determine a driving range of the vehicle based on the first profile; and
notify the first driver of determined the driving range.

19. A vehicle system comprising:
a computer processor; and
a non-transitory computer-readable storage medium storing computer program modules configured to execute on the computer processor, the computer program modules comprising:
a calibration module configured to store a plurality of profiles associated with a first driver that has been identified as not anonymous, each profile including driving characteristics of the first driver during one of a plurality of prior trips;
an identification module configured to determine that the first driver is operating an electric vehicle;
a route module configured to receive a destination for a current trip by the first driver of the electric vehicle from a starting location to the destination; and
an energy module configured to:
determine whether the electric vehicle has enough energy to reach the destination along a route based on driving characteristics included in a first profile from the plurality of profiles, the first profile describing driving characteristics of the first driver during a first prior trip from the plurality of prior trips;

track driving characteristics of the first driver during the current trip along the route;

determine whether the tracked driving characteristics of the first driver along the route of the current trip deviate from the driving characteristics included in the first profile; and responsive to determining that the tracked driving characteristics deviate from the driving characteristics included in the first profile, determine whether the electric vehicle has enough energy to reach the destination along the route based on a second profile from the plurality of profiles, the second profile including driving characteristics of the first driver during a second prior trip from the plurality of trips that best match the tracked driving characteristics.

20. The system of claim 19, wherein the tracked driving characteristics comprise characteristics of the first driver that affect the amount of energy remaining in a battery of the vehicle.

21. The system of claim 19, wherein the tracked driving characteristics include one or more of the following: use of brakes of the vehicle, use of a throttle of the vehicle, and use of an accessory vehicle component that operates using energy of a vehicle battery.

22. The system of claim 19, wherein the calibration module is further configured to track during the current trip one or more external factors that are out of the control of the first driver and may have an influence on a travel time of the current trip or a driving range of the vehicle.

23. The system of claim 19, further comprising:

the route module further configured to identify the route to the destination responsive to receiving the destination for the current trip; and the energy module further configured to:
generate a query that includes first driver information and route information;

receive the first profile as the best match to the query from the plurality of profiles of the first driver, the first profile summarizing the driving characteristics tracked during the first prior trip; and determine whether the vehicle has enough energy to reach the destination based on the driving characteristics of the first profile.

24. The system of claim 19, the energy module further configured to determine whether the vehicle has enough energy to travel to a subsequent destination after reaching the destination.

25. The system of claim 19, further comprising:
a suggestion module configured to:
determine a modification to one or more of the tracked driving characteristics that will allow the vehicle to reach the destination, responsive to determining that the vehicle cannot reach the destination; and
notify the first driver of the modification.

26. The system of claim 19, the energy module further configured to:
determine a driving range of the vehicle based on the first profile; and
notify the first driver of determined the driving range.

27. A computer-implemented method comprising:
storing a plurality of profiles associated with a first driver that has been identified as not anonymous, each profile including driving characteristics of the first driver during one of a plurality of prior trips;

determining that the first driver is operating an electric vehicle;

receiving a destination for a current trip by the first driver of the electric vehicle from a starting location to the destination;

determining a driving range of the electric vehicle along a route for the current trip based on driving characteristics included in a first profile from the plurality of profiles, the first profile describing driving characteristics of the first driver during a first prior trip from the plurality of prior trips;

tracking driving characteristics of the first driver during the current trip along the route;

determining whether the tracked driving characteristics of the first driver along the route of the current trip deviate from the driving characteristics included in the first profile;

responsive to determining that the tracked driving characteristics deviate from the driving characteristics included in the first profile, updating the driving range of the electric vehicle based on a second profile from the plurality of profiles, the second profile including driving characteristics of the first driver during a second prior trip from the plurality of trips that best match the tracked driving characteristics; and responsive to updating the driving range, notifying the first driver of the driving range.

* * * * *